(12) United States Patent
Deutscher et al.

(10) Patent No.: US 8,432,140 B1
(45) Date of Patent: Apr. 30, 2013

(54) DUAL MODE BOOST REGULATOR

(75) Inventors: Neil Deutscher, Phoenix, AZ (US);
Jinhui Chen, Chandler, AZ (US); James S. Bartling, Chandler, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 13/371,819

(22) Filed: Feb. 13, 2012

(51) Int. Cl.
*G05F 1/10* (2006.01)
*G05F 1/40* (2006.01)

(52) U.S. Cl.
USPC .............. 323/222; 323/285; 323/351

(58) Field of Classification Search ............ 323/222, 323/238, 282–285, 290, 321, 351, 901
See application file for complete search history.

(56) References Cited

U.S. PATENT DOCUMENTS

| | | | |
|---|---|---|---|
| 6,630,817 B1 * | 10/2003 | Kison et al. ................ 323/274 |
| 7,365,718 B2 * | 4/2008 | Tsuchida et al. ............. 345/82 |
| 8,044,649 B2 * | 10/2011 | Schmeller et al. .......... 323/285 |
| 8,232,790 B2 * | 7/2012 | Leong et al. ................ 323/285 |

* cited by examiner

*Primary Examiner* — Jessica Han
(74) *Attorney, Agent, or Firm* — King & Spalding L.L.P.

(57) ABSTRACT

An integrated circuit boost regulator design providing selection of either a low power on-chip power component boost regulator circuit or a high power off-chip power component boost regulator circuit using the same integrated circuit device.

19 Claims, 2 Drawing Sheets

DUAL MODE BOOST REGULATOR

TECHNICAL FIELD

The present disclosure relates to integrated circuit devices having boost regulator circuits, and more particularly, to a integrated circuit boost regulator with selection of either on-chip low power or off-chip high power components.

BACKGROUND

An Electronic device operating from a single battery will have a smaller form factor. However, for the electronic device to operate from the native voltage of the single battery, e.g., about 0.9 to 1.8 volts, the voltage used by the electronic device circuits must be increased to about 3.3 volts. A boost regulator is used to step up the battery voltage to the higher voltage required by the circuits in the electronic device. A complete boost regulator, including power switching transistors, may be fabricated in an integrated circuit (IC) chip but is limited to low power applications of typically 65 milliwatts or less. When higher power is required, a hybrid boost regulator using power transistors external to the IC chip may be used for applications requiring greater power. However, the hybrid boost regulator with the external power transistors costs more, is more complex and requires more space on a printed circuit board, including heat sinking. Heretofore, differently designed integrated circuits with integral boost regulator control circuits were used for low power or high power applications, but not both. This necessitated two different integrated designs and at least two very different and not interchangeable types of integrated circuit parts.

SUMMARY

Therefore, a need exists for a boost regulator integrated circuit design that provides selection of voltage regulator topologies that may be used for either a low power on-chip power component boost regulator circuit or a high power off-chip power component boost regulator circuit using the same integrated circuit design and device, and having selection of circuit topologies for either low or high power applications.

According to an embodiment, a dual mode boost regulator in an integrated circuit device (102) may comprise: a power source terminal (134); a power source common terminal (142); an inductor terminal (136); a external transistor gate control terminal (138); a voltage output terminal (140); a boost regulator mode select terminal (126); a voltage sense terminal (141); a transistor switching control circuit (108) having a mode select input coupled to the boost regulator mode select terminal (126); a first power transistor (124) coupled between the inductor terminal (136) and the voltage output terminal (140), and controlled by the transistor switching control circuit (108); a voltage feedback circuit (106) coupled between the voltage output terminal (140) and the transistor switching control circuit (108), and having at least one input coupled to at least one voltage reference; a start-up circuit (110); an oscillator (112) coupled to the start-up circuit (110) and the transistor switching control circuit (108); a second power transistor (116) coupled between the inductor terminal (136) and the power source common terminal (142), and controlled by the transistor switching control circuit (108); a first voltage measurement device (114) having an output coupled to the transistor switching control circuit (108); a second voltage measurement device (115) having a first differential input coupled to the inductor terminal (136) and a second differential input coupled to the voltage sense terminal (141); and a mode selection switch (118) having a common coupled to an input of the first voltage measurement device (114), a first input coupled to the inductor terminal (136) and a second input coupled to an output of the second voltage measurement device (115); wherein when a low power boost regulator mode is selected through the boost regulator mode select terminal (126) the first power transistor (124) and the second power transistor (116) are active and controlled by the transistor switching control circuit (108), and the input of the voltage measurement device (114) is coupled to the inductor terminal (136) through the mode selection switch (118); and when a high power boost regulator mode is selected through the boost regulator mode select terminal (126) the first power transistor (124) and the second power transistor (116) are inactive, and the input of the first voltage measurement device (114) is coupled to the output of the second voltage measurement device (115) through the mode selection switch (118).

According to a further embodiment, when in the low power boost regulator mode, an inductor (120) is coupled between the a power source terminal (134) and the inductor terminal (136); a power source (122) coupled between the power source terminal (134) and the power source common terminal (142); and a filter capacitor (104) coupled between the voltage output terminal (140) and the power source common terminal (142).

According to a further embodiment, when in the high power boost regulator mode, an inductor (120) is coupled between the a power source terminal (134) and the inductor terminal (136); a power source (122) coupled between the power source terminal (134) and the power source common terminal (142); a filter capacitor (104) coupled between the voltage output terminal (140) and the power source common terminal (142); a Schottky power diode coupled between the inductor terminal (136) and the voltage output terminal (140); a third power transistor (230) having a source coupled to the power source common terminal (142), a gate coupled to the external transistor gate control terminal (138) and a drain coupled to the voltage sense terminal (141); and a current sense resistor (228) coupled between the voltage sense terminal (141) and the inductor terminal (136).

According to a further embodiment, the transistor switching control circuit (108) generates pulse width modulation or frequency modulation control signals. According to a further embodiment, the oscillator (112) uses a resistance-capacitance circuit in determining an oscillator frequency thereof. According to a further embodiment, the first power transistor (124) is a P-channel metal oxide semiconductor field effect transistor. According to a further embodiment, the second power transistor (116) is a N-channel metal oxide semiconductor field effect transistor. According to a further embodiment, the third power transistor (230) is a N-channel metal oxide semiconductor field effect transistor. According to a further embodiment, the power source (122) is a battery. According to a further embodiment, the battery has a voltage from about 0.9 volts to about 1.8 volts.

According to a further embodiment, the first voltage measurement device (114) is a differential input operational amplifier. According to a further embodiment, the second voltage measurement device (115) is a differential input operational amplifier. According to a further embodiment, wherein the integrated circuit device (102) is a microcontroller that comprises analog and digital circuits, and a digital memory. According to a further embodiment, selection of the boost regulator mode is stored in a non-volatile memory. According to a further embodiment, the non-volatile memory is selected from the group consisting of a fuse bit and an electrically programmable non-volatile memory bit.

According to another embodiment, a method of providing a dual mode boost regulator in an integrated circuit device (102), said method comprising the steps of: providing a power source terminal (134); providing a power source common terminal (142); providing an inductor terminal (136); providing a voltage output terminal (140); providing a boost regulator mode select terminal (126); providing a voltage sense terminal (141); providing a transistor switching control circuit (108) having a mode select input coupled to the boost regulator mode select terminal (126); providing a external transistor gate control terminal (138) coupled to the transistor switching control circuit (108); providing a first power transistor (124) coupled between the inductor terminal (136) and the voltage output terminal (140), and controlled by the transistor switching control circuit (108); providing a voltage feedback circuit (106) coupled between the voltage output terminal (140) and the transistor switching control circuit (108), and having at least one input coupled to at least one voltage reference; providing a start-up circuit (110); providing an oscillator (112) coupled to the start-up circuit (110) and the transistor switching control circuit (108); providing a second power transistor (116) coupled between the inductor terminal (136) and the power source common terminal (142), and controlled by the transistor switching control circuit (108); providing a first voltage measurement device (114) having an output coupled to the transistor switching control circuit (108); providing a second voltage measurement device (115) having a first differential input coupled to the inductor terminal (136) and a second differential input coupled to the voltage sense terminal (141); and providing a mode selection switch (118) having a common coupled to an input of the first voltage measurement device (114), a first input coupled to the inductor terminal (136) and a second input coupled to an output of the second voltage measurement device (115); selecting a low power boost regulator mode comprises the steps of: controlling the first power transistor (124) and the second power transistor (116) with the transistor switching control circuit (108), coupling the input of the first voltage measurement device (114) to the inductor terminal (136) through the mode selection switch (118); and selecting a high power boost regulator mode comprises the steps of: deactivating the first power transistor (124) and the second power transistor (116); and coupling the input of the first voltage measurement device (114) to the output of the second voltage measurement device (115) through the mode selection switch (118).

According to a further embodiment of the method, the step of selecting the low power boost regulator mode further comprises the steps of: coupling an inductor (120) between the a power source terminal (134) and the inductor terminal (136); coupling a power source (122) between the power source terminal (134) and the power source common terminal (142); and coupling a filter capacitor (104) between the voltage output terminal (140) and the power source common terminal (142).

According to a further embodiment of the method, the step of selecting the high power boost regulator mode further comprises the steps of: coupling an inductor (120) between the a power source terminal (134) and the inductor terminal (136); coupling a power source (122) between the power source terminal (134) and the power source common terminal (142); coupling a filter capacitor (104) between the voltage output terminal (140) and the power source common terminal (142); coupling a Schottky power diode between the inductor terminal (136) and the voltage output terminal (140); coupling a source of a third power transistor (230) to the power source common terminal (142); coupling a gate of the third power transistor (230) to the external transistor gate control terminal (138); coupling a drain of the third power transistor (230) to the voltage sense terminal (141); and coupling a current sense resistor (228) between the voltage sense terminal (141) and the inductor terminal (136).

According to a further embodiment of the method, the step of selecting the low or high power boost regulator mode comprises the step of storing the power boost regulator mode in a non-volatile memory.

BRIEF DESCRIPTION OF THE DRAWINGS

A more complete understanding of the present disclosure may be acquired by referring to the following description taken in conjunction with the accompanying drawings wherein.

Figure 1:
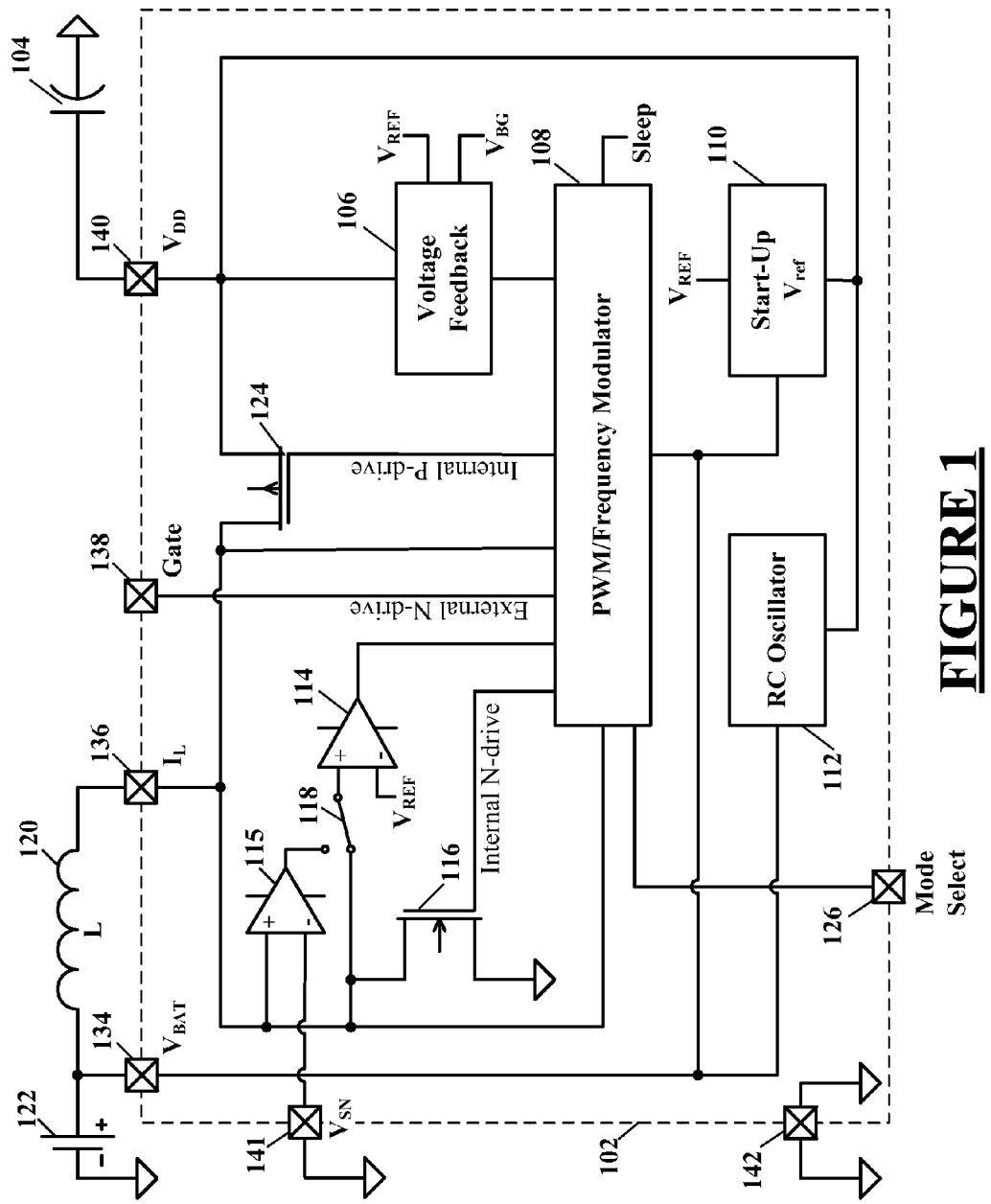
FIG. 1 is a schematic circuit and block diagram of an integrated circuit device comprising selectable dual mode boost regulator topologies and configured as a low power boost regulator, according to a specific example embodiment of this disclosure.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

Referring now to the drawing, the details of specific example embodiments are schematically illustrated. Like elements in the drawings will be represented by like numbers, and similar elements will be represented by like numbers with a different lower case letter suffix.

Referring to FIG. 1, depicted is a schematic circuit and block diagram of an integrated circuit device comprising selectable dual mode boost regulator topologies and configured as a low power boost regulator, according to a specific example embodiment of this disclosure. A boost regulator circuit in an integrated circuit (IC) device 102 comprises a closed loop voltage feedback circuit 106, a PWM/frequency modulator 108, a start-up circuit 110, a resistor-capacitor (RC) oscillator 112, operational amplifiers 114 and 115, a shunt switching transistor 116, solid state switch 118, and a series power switching transistor 124. External to the IC device 102, but necessary to operation of the low power boost regulator, are an inductor 120 and a filter capacitor 104. The boost regulator of the IC device 102 receives power (voltage and current) from a power source 122, e.g., battery, alternating current (AC) to rectified direct current (DC) (not shown), etc. The IC device 102 may be, for example but is not limited to, a mixed signal (analog and digital circuits) IC device, e.g., a microcontroller having program and data storage memory.

The boost regulator shown in FIG. 1 is a DC/DC switching regulator using power switches internal to the IC device 102 (transistors 116 and 124) for low power applications. Low voltage, e.g., 0.9 to 1.8 volts, from a battery 122 is supplied to a power source terminal 134, $V_{BAT}$, and a power source common terminal 142 of the IC device 102. The control circuits in the PWM/frequency modulator 108 control the switching of the internal power transistors 116 (NMOS-FET) and 124 (PMOS-FET) to boost the output voltage at the $V_{DD}$ terminal 140 connected to the filter capacitor 104. This DC/DC switching regulator also has a built-in oscillator 112, e.g., resistor-capacitor (RC), that determines the switching frequency of the power transistors 116 and 124. A voltage feedback circuit 106 and a current feedback circuit comprising operational amplifier 114 and switch 118 monitor the output voltage, $V_{DD}$, (terminal 140) and input current, respectively, to control the output voltage, $V_{DD}$. A start-up circuit 110 is also included to manage the initial ramp-up of the output voltage, $V_{DD}$. The switch 118 may be a solid state single poll double throw switch fabricated using MOSFET and/or CMOS transistor switches on the integrated circuit die comprising the IC device 102. The selection position of the switch 118 is determined by whether a low power mode or a high power mode is selected through the mode selection terminal 126 and this selection may be in a non-volatile memory (not shown) as more fully described hereinafter.

When the DC/DC switching regulator starts, the output voltage, $V_{DD}$, at terminal 140 slowly increases through the PMOS transistor 124. The start-up circuit 110 limits the current through the PMOS transistor 124 until the voltage, $V_{DD}$, reaches approximately the input voltage, $V_{BAT}$. Then built-in oscillator 112 turns on and the driver circuits in the PWM/frequency modulator 108 begin alternately turning on and off the internal power transistors 116 and 124 with non-overlapping turn-on signals with a dead band during switching between the on and off states of each of the transistors 116 and 124. During this start-up time the switching regulator operates at a fixed duty cycle.

When the output voltage, $V_{DD}$, reaches a sufficiently high enough voltage, a bandgap voltage reference, $V_{BG}$, and a low drop-out (LDO) circuit will turn on. Then the PWM portion of the PWM/frequency modulator 108 becomes active and the duty cycle of PWM signals (turning on and off the transistors 116 and 124) will be adjusted to supply the current and the voltage necessary to produce and maintain the regulated output voltage, $V_{DD}$. A closed loop analog voltage feedback circuit 106, or the like, may be used as a voltage error feedback circuit in combination with a voltage reference, $V_{REF}$, and/or a bandgap voltage reference, $V_{BG}$, to provide an error voltage to the PWM/frequency modulator 108 so as to maintain a substantially constant regulated output voltage, $V_{DD}$. To implement current-mode control, the current through the internal NMOS transistor 116 is determined by measuring the voltage across the drain-source of the transistor 116 in "on" saturation with the amplifier 114 and the switch 118 in the connection position shown in FIG. 1. This current measurement is then used to adjust the duty cycle of the switching regulator. Low power/high power mode selection may be performed by a mode selection signal at the mode select terminal 126, and the mode selected may be retained in a non-volatile memory such as for example, but not limited to, a fuse bit, an electrically programmable non-volatile memory bit, etc. It is contemplated and within the scope of this disclosure that other methods and ways of measuring operating current of the DC/DC switching regulator may be used with equal success, and that one having ordinary skill in integrated circuit and switching regulator design, and having the benefit of this disclosure, could readily create alternate designs for measuring such current.

Figure 2:
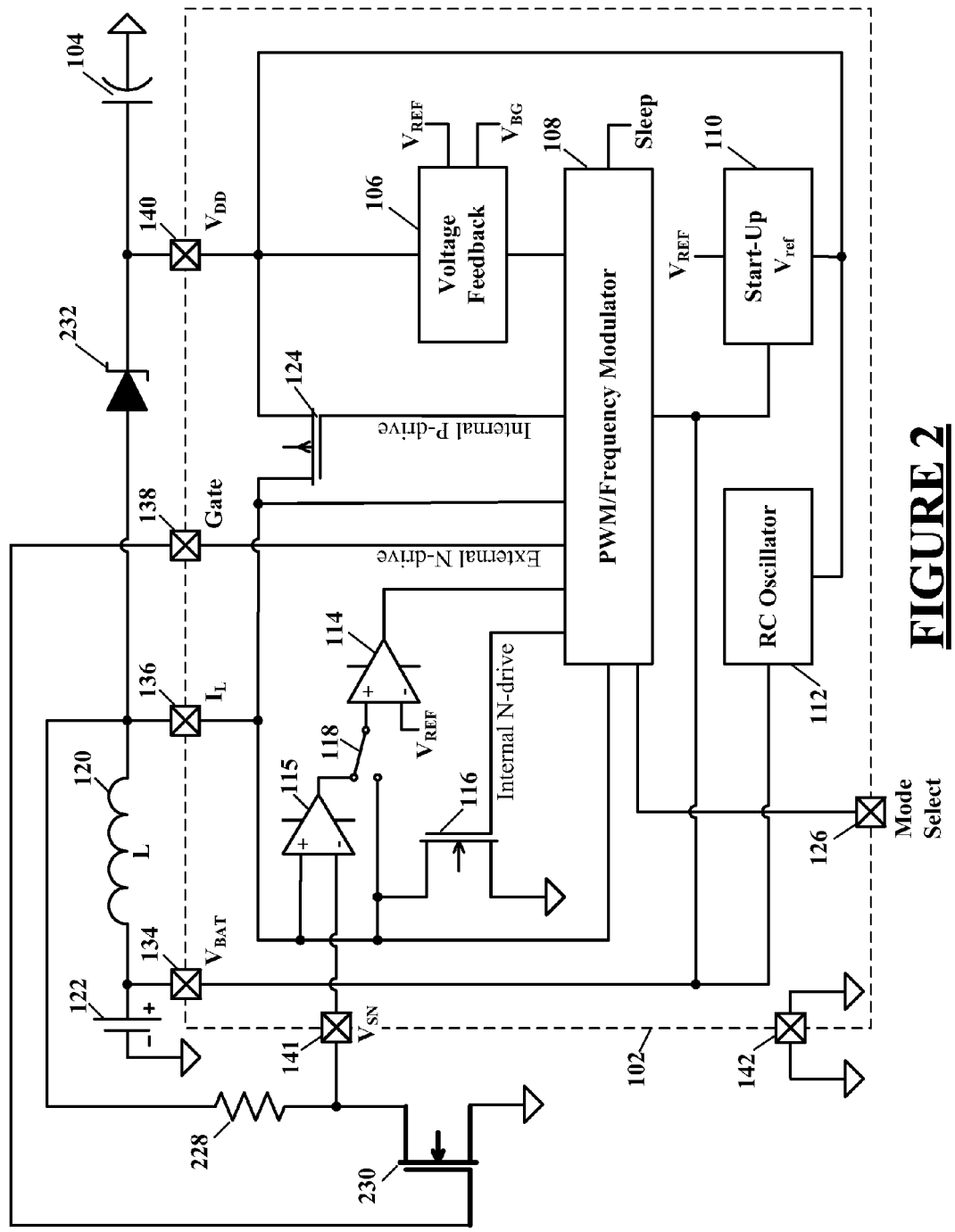
FIG. 2 is a schematic circuit and block diagram of an integrated circuit device comprising selectable dual mode boost regulator topologies and configured as a high power boost regulator, according to another specific example embodiment of this disclosure.

Referring to FIG. 2, depicted is a schematic circuit and block diagram of an integrated circuit device comprising selectable dual mode boost regulator topologies and configured as a high power boost regulator, according to another specific example embodiment of this disclosure. The boost regulator circuit in the integrated circuit (IC) device 102 comprises a closed loop voltage feedback circuit 106, a PWM/frequency modulator 108, a start-up circuit 110, a resistor-capacitor (RC) oscillator 112, operational amplifiers 114 and 115, a shunt power switching transistor 116 (not used in high power mode), solid state switch 118, and a series power switching transistor 124 (not used in high power mode). External to the IC device 102, but necessary to operation of the high power boost regulator, are an inductor 120, an external shunt power switching transistor 230, a current sense resistor 228 used for measuring current through the inductor 120, a power Schottky diode 232 and a filter capacitor 104. The boost regulator of the IC device 102 receives power (voltage and current) from the power source 122, e.g., battery, alternating current (AC) to rectified direct current (DC) (not shown), etc. The IC device 102 may be for, example but is not limited to, a mixed signal (analog and digital circuits) IC device, e.g., a microprocessor having program and data storage memory.

Operation of the high power boost regulator mode is substantially the same as the low power regulator mode except that current-mode control is implemented by detecting the current through a very small resistance value current sense resistor 228 is series with the NMOS external shunt power switching transistor 230 (e.g., measuring the voltage across the resistor 228). This current measurement may be used to adjust the duty cycle of the switching regulator. The PMOS transistor 124 may be replaced by an external power Schottky diode 232, because using the internal power transistors 116 and 124 for higher power applications would require making them very large. Thus using the external NMOS power switching transistor 230 and the external power Schottky diode 232 mitigates the increased cost and efficiency loss that would result if internal power switching transistors were used for high power applications.

When the high power mode selection is made through the mode select terminal 126, the external NMOS power switching transistor 230 is selected and the internal switching transistors 116 and 124 are deselected. A sense terminal 141 and an inductor terminal 136 couple the current sense resistor 228 to the inputs of the differential amplifier 115. The differential amplifier 115 detects a voltage representative of the current through the current sense resistor 228, and the switch 118, when in the position shown, couples the output of the differential amplifier 115 to the positive input of the differential amplifier 114. The amplifier 115 is configured so as to provide an output representative of the current flowing in the current sense resistor 228. Thus current-mode control is available for both low and high power applications with the same IC device 102. Also when the high power mode is selected, the compensation network of the control loop voltage feedback circuit 106 is adjusted appropriately for voltage feedback regulation of the higher load current.

It is contemplated and within the scope of this disclosure that other methods and ways of measuring operating current through the current sense resistor 228 may be used with equal success, and that one having ordinary skill in integrated circuit and switching regulator design, and having the benefit of this disclosure, could readily create alternate designs for measuring such current.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. A dual mode boost regulator in an integrated circuit device (102), comprising:
    a power source terminal (134);
    a power source common terminal (142);
    an inductor terminal (136);
    a external transistor gate control terminal (138);
    a voltage output terminal (140);
    a boost regulator mode select terminal (126);
    a voltage sense terminal (141);
    a transistor switching control circuit (108) having a mode select input coupled to the boost regulator mode select terminal (126);
    a first power transistor (124) coupled between the inductor terminal (136) and the voltage output terminal (140), and controlled by the transistor switching control circuit (108);
    a voltage feedback circuit (106) coupled between the voltage output terminal (140) and the transistor switching control circuit (108), and having at least one input coupled to at least one voltage reference;
    a start-up circuit (110);
    an oscillator (112) coupled to the start-up circuit (110) and the transistor switching control circuit (108);
    a second power transistor (116) coupled between the inductor terminal (136) and the power source common terminal (142), and controlled by the transistor switching control circuit (108);
    a first voltage measurement device (114) having an output coupled to the transistor switching control circuit (108);
    a second voltage measurement device (115) having a first differential input coupled to the inductor terminal (136) and a second differential input coupled to the voltage sense terminal (141); and
    a mode selection switch (118) having a common coupled to an input of the first voltage measurement device (114), a first input coupled to the inductor terminal (136) and a second input coupled to an output of the second voltage measurement device (115);
    wherein
        when a low power boost regulator mode is selected through the boost regulator mode select terminal (126) the first power transistor (124) and the second power transistor (116) are active and controlled by the transistor switching control circuit (108), and the input of the voltage measurement device (114) is coupled to the inductor terminal (136) through the mode selection switch (118); and
        when a high power boost regulator mode is selected through the boost regulator mode select terminal (126) the first power transistor (124) and the second power transistor (116) are inactive, and the input of the first voltage measurement device (114) is coupled to the output of the second voltage measurement device (115) through the mode selection switch (118).

2. The dual mode boost regulator according to claim 1, when in the low power boost regulator mode, further comprising:
    an inductor (120) coupled between the a power source terminal (134) and the inductor terminal (136);
    a power source (122) coupled between the power source terminal (134) and the power source common terminal (142); and
    a filter capacitor (104) coupled between the voltage output terminal (140) and the power source common terminal (142).

3. The dual mode boost regulator according to claim 1, when in the high power boost regulator mode, further comprising:
    an inductor (120) coupled between the a power source terminal (134) and the inductor terminal (136);
    a power source (122) coupled between the power source terminal (134) and the power source common terminal (142);
    a filter capacitor (104) coupled between the voltage output terminal (140) and the power source common terminal (142);
    a Schottky power diode coupled between the inductor terminal (136) and the voltage output terminal (140);
    a third power transistor (230) having a source coupled to the power source common terminal (142), a gate coupled to the external transistor gate control terminal (138) and a drain coupled to the voltage sense terminal (141); and
    a current sense resistor (228) coupled between the voltage sense terminal (141) and the inductor terminal (136).

4. The dual mode boost regulator according to claim 3, wherein the third power transistor (230) is a N-channel metal oxide semiconductor field effect transistor.

5. The dual mode boost regulator according to claim 1, wherein the transistor switching control circuit (108) generates pulse width modulation or frequency modulation control signals.

6. The dual mode boost regulator according to claim 1, wherein the oscillator (112) uses a resistance-capacitance circuit in determining an oscillator frequency thereof.

7. The dual mode boost regulator according to claim 1, wherein the first power transistor (124) is a P-channel metal oxide semiconductor field effect transistor.

8. The dual mode boost regulator according to claim 1, wherein the second power transistor (116) is a N-channel metal oxide semiconductor field effect transistor.

9. The dual mode boost regulator according to claim 1, wherein the power source (122) is a battery.

10. The dual mode boost regulator according to claim 9, wherein the battery has a voltage from about 0.9 volts to about 1.8 volts.

11. The dual mode boost regulator according to claim 1, wherein the first voltage measurement device (114) is a differential input operational amplifier.

12. The dual mode boost regulator according to claim 1, wherein the second voltage measurement device (115) is a differential input operational amplifier.

13. The dual mode boost regulator according to claim 1, wherein the integrated circuit device (102) is a microcontroller that comprises analog and digital circuits, and a digital memory.

14. The dual mode boost regulator according to claim 1, wherein selection of the boost regulator mode is stored in a non-volatile memory.

15. The dual mode boost regulator according to claim 14, wherein the non-volatile memory is selected from the group consisting of a fuse bit and an electrically programmable non-volatile memory bit.

16. A method of providing a dual mode boost regulator in an integrated circuit device (102), said method comprising the steps of:
- providing a power source terminal (134);
- providing a power source common terminal (142);
- providing an inductor terminal (136);
- providing a voltage output terminal (140);
- providing a boost regulator mode select terminal (126);
- providing a voltage sense terminal (141);
- providing a transistor switching control circuit (108) having a mode select input coupled to the boost regulator mode select terminal (126);
- providing a external transistor gate control terminal (138) coupled to the transistor switching control circuit (108);
- providing a first power transistor (124) coupled between the inductor terminal (136) and the voltage output terminal (140), and controlled by the transistor switching control circuit (108);
- providing a voltage feedback circuit (106) coupled between the voltage output terminal (140) and the transistor switching control circuit (108), and having at least one input coupled to at least one voltage reference;
- providing a start-up circuit (110);
- providing an oscillator (112) coupled to the start-up circuit (110) and the transistor switching control circuit (108);
- providing a second power transistor (116) coupled between the inductor terminal (136) and the power source common terminal (142), and controlled by the transistor switching control circuit (108);
- providing a first voltage measurement device (114) having an output coupled to the transistor switching control circuit (108);
- providing a second voltage measurement device (115) having a first differential input coupled to the inductor terminal (136) and a second differential input coupled to the voltage sense terminal (141); and
- providing a mode selection switch (118) having a common coupled to an input of the first voltage measurement device (114), a first input coupled to the inductor terminal (136) and a second input coupled to an output of the second voltage measurement device (115);
- selecting a low power boost regulator mode comprises the steps of:
  - controlling the first power transistor (124) and the second power transistor (116) with the transistor switching control circuit (108),
  - coupling the input of the first voltage measurement device (114) to the inductor terminal (136) through the mode selection switch (118); and
- selecting a high power boost regulator mode comprises the steps of:
  - deactivating the first power transistor (124) and the second power transistor (116); and
  - coupling the input of the first voltage measurement device (114) to the output of the second voltage measurement device (115) through the mode selection switch (118).

17. The method according to claim 16, wherein the step of selecting the low power boost regulator mode further comprises the steps of:
- coupling an inductor (120) between the a power source terminal (134) and the inductor terminal (136);
- coupling a power source (122) between the power source terminal (134) and the power source common terminal (142); and
- coupling a filter capacitor (104) between the voltage output terminal (140) and the power source common terminal (142).

18. The method according to claim 16, wherein the step of selecting the high power boost regulator mode further comprises the steps of:
- coupling an inductor (120) between the a power source terminal (134) and the inductor terminal (136);
- coupling a power source (122) between the power source terminal (134) and the power source common terminal (142);
- coupling a filter capacitor (104) between the voltage output terminal (140) and the power source common terminal (142);
- coupling a Schottky power diode between the inductor terminal (136) and the voltage output terminal (140);
- coupling a source of a third power transistor (230) to the power source common terminal (142);
- coupling a gate of the third power transistor (230) to the external transistor gate control terminal (138);
- coupling a drain of the third power transistor (230) to the voltage sense terminal (141); and
- coupling a current sense resistor (228) between the voltage sense terminal (141) and the inductor terminal (136).

19. The method according to claim 16, wherein the step of selecting the low or high power boost regulator mode comprises the step of storing the power boost regulator mode in a non-volatile memory.

* * * * *